United States Patent
Hou et al.

(10) Patent No.: US 12,208,787 B2
(45) Date of Patent: Jan. 28, 2025

(54) ENERGY COORDINATION CONTROL METHOD AND SYSTEM AND VEHICLE

(71) Applicant: GREAT WALL MOTOR COMPANY LIMITED, Baoding (CN)

(72) Inventors: Wentao Hou, Baoding (CN); Zhimin Hu, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 114 days.

(21) Appl. No.: 17/789,529

(22) PCT Filed: Jan. 19, 2021

(86) PCT No.: PCT/CN2021/072669
§ 371 (c)(1),
(2) Date: Jun. 28, 2022

(87) PCT Pub. No.: WO2021/179798
PCT Pub. Date: Sep. 16, 2021

(65) Prior Publication Data
US 2023/0065178 A1    Mar. 2, 2023

(30) Foreign Application Priority Data
Mar. 10, 2020   (CN) .......................... 202010162805.1

(51) Int. Cl.
*B60W 20/13*    (2016.01)
*B60H 1/00*    (2006.01)
(Continued)

(52) U.S. Cl.
CPC ............. *B60W 20/13* (2016.01); *B60H 1/004* (2013.01); *B60K 6/26* (2013.01); *B60W 10/06* (2013.01);
(Continued)

(58) Field of Classification Search
CPC ..................................................... B60W 20/13
See application file for complete search history.

(56) References Cited

U.S. PATENT DOCUMENTS 6,874,330 B2 * 4/2005 Iritani .................. B60H 1/3208
62/236
7,350,365 B2 * 4/2008 Kim ........................ F25B 27/02
62/323.3
(Continued)

FOREIGN PATENT DOCUMENTS

CN   108466530 A   8/2018
EP    3272603 A1   1/2018
JP    2013-043478 A   3/2013

OTHER PUBLICATIONS

Extended European Search Report for App. No. 21767800.2, dated Dec. 9, 2022 (8 Pages).

*Primary Examiner* — Michael A Berns
(74) *Attorney, Agent, or Firm* — NIXON PEABODDY LLP; Jeffrey L. Costellia

(57) ABSTRACT

An energy coordination control method. The vehicle comprises an engine, a generator, a battery, a charger and an air conditioner. The generator is mechanically connected to the engine, the generator and the charger are both electrically connected to the battery, the battery is electrically connected to the air conditioner, and the generator is electrically connected to the air conditioner. The method comprises: when a charging signal is detected, controlling the charger to charge the battery, and monitoring an air conditioner signal of the air conditioner (S100); and if it is determined, according to the air conditioner signal, that the air conditioner has the demand for electricity, controlling the engine to start to drive the generator to supply power to the air conditioner (S200). An energy coordination control system, the vehicle, a computer processing device, a computer
(Continued)

program and a computer-readable medium are further provided.

8 Claims, 3 Drawing Sheets

(51) Int. Cl.
  *B60K 6/26*    (2007.10)
  *B60W 10/06*   (2006.01)
  *B60W 10/08*   (2006.01)

(52) U.S. Cl.
  CPC ....... *B60W 10/08* (2013.01); *B60W 2510/305* (2013.01); *B60W 2710/305* (2013.01); *B60Y 2200/92* (2013.01)

(56) References Cited

U.S. PATENT DOCUMENTS

| | | | | |
|---|---|---|---|---|
| 7,552,705 | B2 * | 6/2009 | Serkh | B60W 20/10 |
| | | | | 180/65.21 |
| 8,286,440 | B2 * | 10/2012 | Harris | B60H 1/3222 |
| | | | | 464/178 |
| 9,340,090 | B2 * | 5/2016 | Fukatsu | B60L 53/62 |
| 10,639,962 | B2 * | 5/2020 | Okamoto | B60H 1/3208 |
| 11,660,965 | B2 * | 5/2023 | Moriya | B60L 53/16 |
| | | | | 701/22 |
| 2008/0217083 | A1 | 9/2008 | Serkh et al. | |
| 2021/0309077 | A1 * | 10/2021 | Lee | G06Q 50/40 |

* cited by examiner

ENERGY COORDINATION CONTROL METHOD AND SYSTEM AND VEHICLE

The present application claims the priority of the Chinese patent application filed on Mar. 10, 2020 before the CNIPA, China National Intellectual Property Administration with the application number of 202010162805.1 and the title of "ENERGY COORDINATION CONTROL METHOD AND SYSTEM AND VEHICLE", which is incorporated herein in its entirety by reference.

TECHNICAL FIELD

The present disclosure relates to the technical field of vehicles, and more particularly, to an energy coordination control method, a system and a vehicle.

BACKGROUND

With the global environmental problem growing increasingly severe, the new-energy vehicle is developing rapidly at current. The new-energy vehicle has the charging function which is capable of transmitting the electric energy in the electrical grid to a battery pack, and then driving the vehicle by using the electric energy in the battery pack, so as to implement the travel with no oil consumption and no exhaust gas.

The hybrid power vehicle refers to a new-energy vehicle that may be driven by electric energy and fossil energy, the power battery pack of the hybrid power vehicle is smaller than the power battery pack of a pure electrical vehicle, and the matching on-board charger is also smaller, therefore, the power of the charger of the hybrid power vehicle is usually less than the rated power of the air conditioner. If the user uses the air conditioner when the hybrid power vehicle is being charged, the power consumed by the normal operation of the air conditioner is greater than the power outputted by the charger, in order to maintain the normal usage of the air conditioner, the power battery pack is required to discharge to supply electricity to the air conditioner, which definitely affects the normal charging of the battery pack.

In view of the problem that the usage of the air conditioner affects the charging of the battery pack, the prior art adopts limiting the power of the air conditioner, i.e., when the vehicle is being charged and the air conditioner is started up, limiting the power of the air conditioner to a low limit, to ensure that the battery may be normally charged. However, due to the power of the air conditioner is limited, the speed of regulation on the in-car temperature is reduced, which affects the user experience.

SUMMARY

In view of the above, the present disclosure provides an energy coordination control method, a system and a vehicle, to solve the problem of conventional hybrid power vehicles that the air conditioner cannot be normally used during charging, to cause a lower speed of regulation on the in-car temperature, to easily bring inconvenience of the driver and the passengers.

In order to achieve the above object, the technical solutions of the present disclosure are implemented as follows:

An energy coordination control method, applied to a vehicle, the vehicle comprising an engine, an electric generator, a battery, a charger and an air conditioner, the electric generator is mechanically connected to the engine, both of the electric generator and the charger are electrically connected to the battery, both of the charger and the battery are electrically connected to the air conditioner, wherein the electric generator is electrically connected to the air conditioner, and the method includes:

when a charging signal is monitored, controlling the charger to charge the battery, and monitoring an air-conditioner signal of the air conditioner; and when it is determined that the air conditioner demands electricity according to the air-conditioner signal, controlling the engine to start up, to drive the electric generator to supply electricity to the air conditioner.

Optionally, in the method, when it is determined that the air conditioner demands electricity according to the air-conditioner signal, controlling the engine to start up, to drive the electric generator to supply electricity to the air conditioner includes:

when a starting-up signal of the air conditioner is monitored, controlling the air conditioner to start up, and controlling the engine to start up, to drive the electric generator to supply electricity to the air conditioner.

Optionally, in the method, when it is determined that the air conditioner demands electricity according to the air-conditioner signal, controlling the engine to start up, to drive the electric generator to supply electricity to the air conditioner includes:

when the air conditioner is monitored to be in an on-state, controlling the engine to start up, to drive the electric generator to supply electricity to the air conditioner, and controlling the battery to stop to supply electricity to the air conditioner.

Optionally, the method further includes:

when a shutting-down signal of the air conditioner is monitored when the charger is charging the battery, controlling the air conditioner to shut down, and controlling the engine to shut down.

Optionally, in the method, wherein controlling the engine to start up, to drive the electric generator to supply electricity to the air conditioner includes:

acquiring a target consumed power of the air conditioner; and controlling the engine to start up, to drive the electric generator to supply electricity to the air conditioner with the target consumed power.

Another object of the embodiments of the present disclosure is to provide an energy coordination control system, applied to a vehicle, the vehicle comprising an engine, an electric generator, a battery, a charger and an air conditioner, the electric generator being mechanically connected to the engine, both of the electric generator and the charger being electrically connected to the battery, both of the charger and the battery being electrically connected to the air conditioner, wherein the electric generator is electrically connected to the air conditioner, and the system includes:

a first controlling module configured for, when a charging signal is monitored, controlling the charger to charge the battery, and monitoring an air-conditioner signal of the air conditioner; and a second controlling module configured for, when it is determined that the air conditioner demands electricity according to the air-conditioner signal, controlling the engine to start up, to drive the electric generator to supply electricity to the air conditioner.

Optionally, in the system, the second controlling module includes:

a first controlling unit configured for, if a starting-up signal of the air conditioner is monitored, controlling the air conditioner to start up, and controlling the engine to start up, to drive the electric generator to supply electricity to the air conditioner.

Optionally, in the system, the second controlling module further includes:

a second controlling unit configured for, when the air conditioner is monitored to be in an on-state, controlling the engine to start up, to drive the electric generator to supply electricity to the air conditioner, and controlling the battery to stop to supply electricity to the air conditioner.

Optionally, the system further includes:

a third controlling module configured for, when the charger is charging the battery, when a shutting-down signal of the air conditioner is monitored, controlling the air conditioner to shut down, and controlling the engine to shut down.

Optionally, in the system, the second controlling module is configured for, if it is determined according to the air-conditioner signal that the air conditioner demands electricity, acquiring a target consumed power of the air conditioner; and controlling the engine to start up, to drive the electric generator to supply electricity to the air conditioner with the target consumed power.

Yet another object of the present disclosure is to provide a vehicle, the vehicle comprising an engine, an electric generator, a battery, a charger and an air conditioner, the electric generator is mechanically connected to the engine, both of the electric generator and the charger are electrically connected to the battery, both of the charger and the battery are electrically connected to the air conditioner, wherein the electric generator is electrically connected to the air conditioner, and the vehicle further includes the energy coordination control system.

As compared with the prior art, the method and energy coordination control system and the vehicle according to the present disclosure have the following advantage:

when a charging signal is monitored, controlling the charger to charge the battery, and monitoring an air-conditioner signal of the air conditioner; and when it is determined that the air conditioner demands electricity according to the air-conditioner signal, controlling the engine to start up, to drive the electric generator to supply electricity to the air conditioner. The reason is that, when the battery is being charged and the air conditioner demands electricity, the engine is started up to drive the electric generator to supply electricity to the air conditioner, the operation of the air conditioner does not need to use the electric energy of the charger or a battery pack, which does not affect the charging power of the battery, and may ensure the normal usage of the air conditioner, thereby solving the problem of conventional hybrid power vehicles that the air conditioner cannot be normally used during charging, to cause a lower speed of regulation on the in-car temperature, to easily bring inconvenience of the driver and the passengers.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art may obtain other figures according to these figures without paying creative work.

The drawings, which form part of the present disclosure, are intended to provide a further understanding of the present disclosure. The illustrative embodiments of the present disclosure and their explanation are intended to interpret the present disclosure, and do not inappropriately limit the present disclosure. In the drawings.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

The embodiments of the present application will be described in further detail below with reference to the drawings. Although the drawings illustrate the embodiments of the present application, it should be understood that the present application may be implemented in various forms, which should not be limited by the embodiments illustrated herein. In contrast, the purpose of providing those embodiments is to more clearly understand the present application, and to completely convey the scope of the present application to a person skilled in the art.

It should be noted that, subject to the avoiding of any conflict, the embodiments and the features of the embodiments of the present disclosure may be combined.

The present disclosure will be described in detail below with reference to the drawings and the embodiments.

Figure 1:
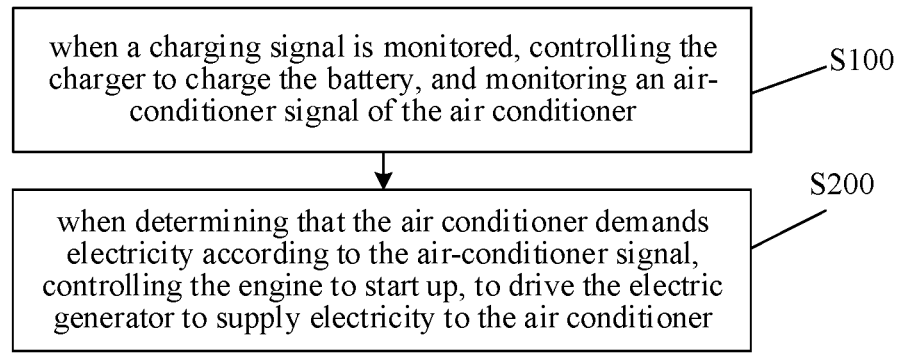
FIG. 1 is a schematic flow chart of an energy coordination control method according to an embodiment of the present disclosure.

Referring to FIG. 1, FIG. 1 shows a schematic flow chart of an energy coordination control method according to an embodiment of the present disclosure. The energy coordination control method according to the embodiment of the present disclosure is applied to a vehicle, the vehicle including an engine, an electric generator, a battery, a charger and an air conditioner, the electric generator is mechanically connected to the engine, both of the electric generator and the charger are electrically connected to the battery, the battery is electrically connected to the air conditioner, wherein the electric generator is electrically connected to the air conditioner, and the method includes the steps S100-S200.

The energy coordination control method according to the embodiment of the present disclosure is suitable for a hybrid-power vehicle. The vehicle includes an engine, an electric generator, a battery, a charger and an air conditioner. The electric generator is mechanically connected to the engine, and therefore the engine may be used to drive the electric generator to generate electricity. The charger is electrically connected to the battery, and therefore the charger may be used to directly charge the battery. At the same time, the electric generator is also electrically connected to the battery, and therefore, when it is required to recover energy, the electric generator may be used to convert the mechanical energy of the engine into electric energy, and the electric energy generated by the electric generator may be inputted into the battery for storage. The battery is electrically connected to the air conditioner, and therefore the battery may be used to supply electricity to the air conditioner, to satisfy the operation of the air conditioner. In addition, because the air conditioner is also electrically connected to the electric generator, when the air conditioner demands electricity, the electric generator may be controlled to supply electricity to the air conditioner.

In practical applications, the charger may also be electrically connected to the air conditioner, and therefore the charger may also be directly used to supply electricity to the air conditioner.

Step S100: when a charging signal is monitored, controlling the charger to charge the battery, and monitoring an air-conditioner signal of the air conditioner.

In the step S100, when the charging signal is monitored, it indicates that the battery is required to be charged. Moreover, because the charger is electrically connected to the battery, when the charging signal is monitored, the charger may be directly controlled to transmit the electric energy in the electrical grid into the battery with a certain power, therefore the battery enters the charging state, to implement the charging of the battery.

In practical applications, the charging signal may be the voltage signal at the input terminal of the charger. The reason is that, when the charger communicates with an external electrical grid, the voltage signal at its input terminal changes, at which point it may be determined that it is required to charge the battery.

In the step S100, it is further required to monitor an air-conditioner signal of the air conditioner after the charging signal is monitored to determine whether the air conditioner demands electricity according to the air-conditioner signal, i.e., monitoring whether the air conditioner demands electricity for operation, so as to determine subsequently whether it is required to start up the engine to supply electricity to the air conditioner. The air-conditioner signal may particularly include a state signal of the air conditioner and a starting-up signal and a shutting-down signal of the air conditioner. If the on-state signal is monitored, it indicates that the air conditioner is currently in the on-state, and accordingly the air conditioner demands electricity. If the starting-up signal of the air conditioner is monitored, it indicates that although the air conditioner is currently in the off-state, it is required to be started up and enter the running state, and therefore the air conditioner also demands electricity. Moreover, if a shutting-down signal of the air conditioner is monitored, it indicates that although the air conditioner is currently in the running state, it is required to be shut down and enter the off-state, and therefore the air conditioner no longer demands to use electricity, or, in other words, does not demand electricity.

Step S200: when it is determined that the air conditioner demands electricity according to the air-conditioner signal, controlling the engine to start up, to drive the electric generator to supply electricity to the air conditioner.

In the step S200, after the charging signal is monitored, when it is determined that the air conditioner demands electricity according to the air-conditioner signal, it indicates that it is required to supply electricity to the air conditioner, at which point the engine is controlled to start up, and the engine may be controlled to drive the electric generator to generate electricity. Due to the air conditioner is electrically connected to the electric generator, the electric energy generated by the electric generator driven by the engine may be used to supply electricity to the air conditioner, thereby driving the operation of the air conditioner. Due to the engine drives the electric generator to supply electricity to the air conditioner, it is not required to supply electricity to the air conditioner by using the charger or the battery, which does not affect the charging power and the charging efficiency of the battery, and may ensure the normal operation of the air conditioner.

Particularly, controlling the engine to start up, to drive the electric generator to supply electricity to the air conditioner particularly includes the steps S201-S202.

Step S201: acquiring a target consumed power of the air conditioner.

In the step S201, the target consumed power of the air conditioner refers to the electricity-consumption power of the air conditioner, i.e., the electricity that the air conditioner demands to consume to reach the target running state, which may be calculated directly by using the operational parameters of the air conditioner for reaching the target running state. In the step S201, the target consumed power of the air conditioner is acquired, so as to subsequently control the power of the electricity generation by the electric generator driven by the engine.

In practical applications, the target consumed power $P_{AC}$ may be calculated according to the sum of the consumed power $P_{PTC}$ of a high-pressure heater and the consumed power $P_{CMP}$ of a refrigerating compressor, wherein $P_{PTC}$ may be calculated according to the operating current and voltage of the high-pressure heater, and $P_{CMP}$ may be calculated according to the operating current and voltage of the refrigerating compressor. Particularly, they are calculated according to the following formulas:

$$P_{AC} = P_{PTC} + P_{CMP} \tag{1}$$

$$P_{PTC} = U_{PTC} \times I_{PTC} \tag{2}$$

$$P_{CMP} = U_{CMP} \times I_{CMP} \tag{3}$$

In the formulas (1)-(3), $P_{AC}$ is the consumed power of the air conditioner, $P_{PTC}$ is the consumed power of the high-pressure heater, $P_{CMP}$ is the consumed power of the refrigerating compressor, $U_{PTC}$ and $I_{PTC}$ are the operating voltage and the operating current of the high-pressure heater respectively, and $U_{CMP}$ and $I_{CMP}$ are the operating voltage and the operating current of the refrigerating compressor, respectively.

Step S202: controlling the engine to start up, to drive the electric generator to supply electricity to the air conditioner with the target consumed power.

Due to the engine is mechanically connected to the electric generator, the engine may be controlled to drive the electric generator to generate electricity, and the electric energy outputted by the electric generator may be regulated by controlling the rotational speed of the engine and the change of the magnetic field of the electric generator. In the step S202, after the engine is started up, not only the engine is controlled to drive the electric generator to generate electricity, but also the electric generator is controlled to supply electricity to the air conditioner with the target consumed power required by the air conditioner; in other words, the electric generator is controlled to generate electricity with the electricity that the air conditioner demands to consume. That may enable the air conditioner to operate in the target operating state without supplying electricity to the air conditioner by using the battery, and prevents the engine from driving the electric generator to generate an electric quantity exceeding the demand of the air conditioner to result in energy waste.

In addition, if a charging stopping signal is received, if the air conditioner is in the running state, then the battery is controlled to supply electricity to the air conditioner, and the engine is controlled to shut down, to drive the air conditioner directly by using the cleaner electric energy in the battery, to prevent using excessive fossil energy to drive the engine to drive the electric generator to supply electricity to the air conditioner.

As compared with the prior art, the method for controlling a vehicle air conditioner according to the present disclosure has the following advantage:

The method includes, when a charging signal is monitored, controlling the charger to charge the battery, and monitoring an air-conditioner signal of the air conditioner; and when it is determined that the air conditioner demands electricity according to the air-conditioner signal, controlling the engine to start up, to drive the electric generator to supply electricity to the air conditioner. The reason is that, when the battery is being charged and the air conditioner demands electricity, the engine is started up to drive the electric generator to supply electricity to the air conditioner, the operation of the air conditioner does not need to use the electric energy of the charger or a battery pack, which does not affect the charging power of the battery, and may ensure the normal usage of the air conditioner, thereby solving the problem of conventional hybrid power vehicles that the air conditioner cannot be normally used during charging, to cause a lower speed of regulation on the in-car temperature, to easily bring inconvenience of the driver and the passengers.

Optionally, in an embodiment, the step S200 includes the step S211:

Step S211: if a starting-up signal of the air conditioner is monitored, controlling the air conditioner to start up, and controlling the engine to start up, to drive the electric generator to supply electricity to the air conditioner.

In the process of the charger charging the battery, if the starting-up signal of the air conditioner is monitored, it indicates that although the air conditioner is currently in the off-state, it is required to be started up and enter the running state, or, in other words, it is determined that the air conditioner demands electricity, at which point the engine is controlled to start up, and the engine may be controlled to drive the electric generator to generate electricity. Due to the air conditioner is electrically connected to the electric generator, the electric energy generated by the electric generator driven by the engine may be used to supply electricity to the air conditioner, thereby driving the operation of the air conditioner. Due to the engine drives the electric generator to supply electricity to the air conditioner, it is not required to supply electricity to the air conditioner by using the charger or the battery, which does not affect the charging power and the charging efficiency of the battery, and may ensure the normal operation of the air conditioner.

Optionally, in an embodiment, the step S200 includes the step S212:

Step S212: when monitoring that the air conditioner is in an on-state, controlling the engine to start up, to drive the electric generator to supply electricity to the air conditioner, and controlling the battery to stop to supply electricity to the air conditioner.

In the step S212, when the charging signal is monitored, if it is monitored that the air conditioner is in the running state, at this point the air conditioner demands electricity, and currently the battery supplies electricity to the air conditioner to satisfy the target consumed power of the air conditioner. Moreover, when the charging signal is monitored, it is also required to control the charger to charge the battery. In order to prevent affecting the charging efficiency of the battery, the engine is controlled to drive the electric generator to supply electricity to the air conditioner with the target consumed power of the air conditioner, therefore the air conditioner is not required to be supplied electricity by the battery, and therefore the power and the efficiency of the charging of the battery by the charger are not affected.

Optionally, in an embodiment, the energy coordination control method according to the embodiment of the present disclosure, after the step S200, further includes the step S300:

Step S300: when the charger is charging the battery, if a shutting-down signal of the air conditioner is monitored, controlling the air conditioner to shut down, and controlling the engine to shut down.

In the step S300, after the charging signal is monitored, the battery is controlled to enter the charging state. At this point, if the shutting-down signal of the air conditioner is monitored, it indicates that the air conditioner is currently in the running state, currently the engine drives the electric generator to supply electricity to the air conditioner, and the air conditioner is required to be shut down, and therefore the air conditioner is controlled to be shut down. At this point, because the air conditioner no longer consumes electric energy, or, in other words, the electric generator is not required to supply electricity to it, the engine is controlled to shut down. In addition, the charger is still charging the battery at this point, so that the charger may satisfy the demand on the electric energy of the battery, and after the air conditioner is shut down, the engine is controlled to shut down, which may not only prevent energy waste, but also may prevent damage of the battery caused by a too large charging power.

Figure 2:
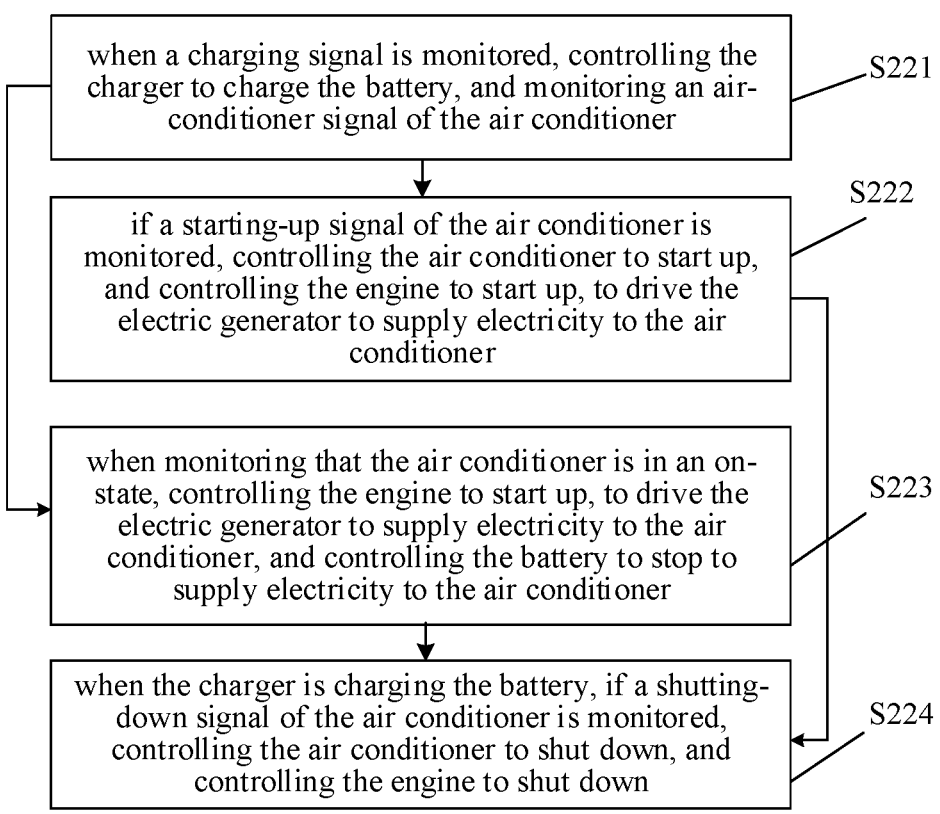
FIG. 2 is a schematic flow chart of the energy coordination control method according to a preferable embodiment of the present disclosure.

Referring to FIG. 2, FIG. 2 shows a schematic flow chart of the energy coordination control method according to a preferable embodiment of the present disclosure. The method is applied to a vehicle, the vehicle comprising an engine, an electric generator, a battery, a charger and an air conditioner, the electric generator is mechanically connected to the engine, both of the electric generator and the charger are electrically connected to the battery, the battery being electrically connected to the air conditioner, wherein the electric generator is electrically connected to the air conditioner, and the method includes the steps S221-S224.

Step S221: when a charging signal is monitored, controlling the charger to charge the battery, and monitoring an air-conditioner signal of the air conditioner.

The step S221 may refer to the detailed description on the step S100, and is not discussed herein further.

Step S222: if a starting-up signal of the air conditioner is monitored, controlling the air conditioner to start up, and controlling the engine to start up, to drive the electric generator to supply electricity to the air conditioner.

The step S222 may refer to the detailed description on the step S211, and is not discussed herein further.

Step S223: when monitoring that the air conditioner is in an on-state, controlling the engine to start up, to drive the electric generator to supply electricity to the air conditioner, and controlling the battery to stop to supply electricity to the air conditioner.

The step S223 may refer to the detailed description on the step S212, and is not discussed herein further.

Step S224: when the charger is charging the battery, if a shutting-down signal of the air conditioner is monitored, controlling the air conditioner to shut down, and controlling the engine to shut down.

The step S224 may refer to the detailed description on the step S300, and is not discussed herein further.

As compared with the prior art, the energy coordination control method according to the embodiments of the present disclosure have the following advantage:

The method includes, at the starting stage of controlling the charger to charge the battery, if the air conditioner is in the on-state, controlling the engine to start up to control the engine to drive the electric generator to supply electricity to the air conditioner, and controlling the battery to stop to supply electricity to the air conditioner at the same time; and, when the charger is charging the battery, if the starting-up signal of the air conditioner is monitored, controlling the engine to start up, controlling the engine to drive the electric generator to generate electricity, and controlling the electric generator to supply electricity to the air conditioner. Therefore, when the battery is being charged by using the charger, if the air conditioner is required to be used, the engine is started up to drive the electric generator to supply electricity to the air conditioner, and therefore the operation of the air conditioner does not need to use the electric energy of the charger or a battery pack, which does not affect the charging power of the battery, and may ensure the normal usage of the air conditioner, thereby solving the problem of conventional hybrid power vehicles that the air conditioner cannot be normally used during charging, to cause a lower speed of regulation on the in-car temperature, to easily bring inconvenience of the driver and the passengers.

Figure 3:
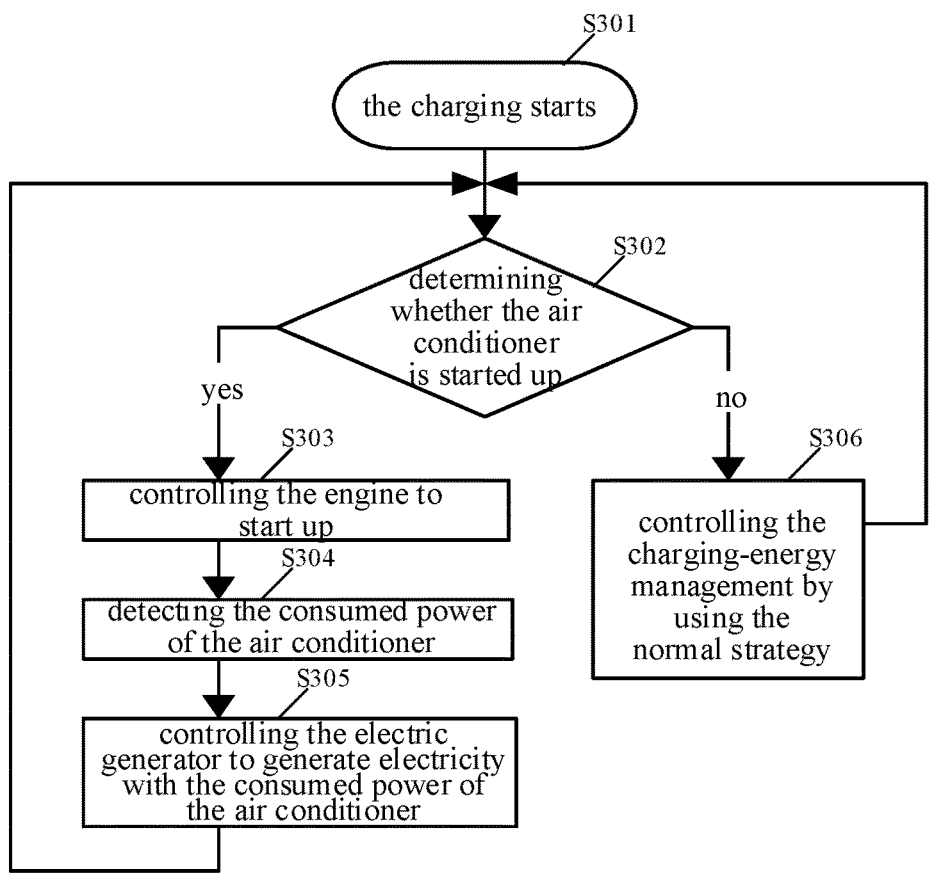
FIG. 3 is a flow chart of the implementation of the energy coordination control method according to an embodiment of the present disclosure.

In practical applications, referring to FIG. 3, FIG. 3 shows a flow chart of the implementation of the energy coordination control method according to an embodiment of the present disclosure.

As shown in FIG. 3, in the step S301, detecting whether the battery starts charging. If the battery starts charging, the process enters the step S302.

In the step S302, determining whether the air conditioner is started up. If the air conditioner is started up, the process enters the step S303. If the air conditioner is not started up, the process enters the step S306.

In the step S303, the engine is controlled to start up to drive the electric generator to generate electricity. Subsequently, in the step S304, the consumed power of the air conditioner is detected. Subsequently, in the step S305, the engine is controlled to generate electricity with the consumed power of the air conditioner, thereby satisfying the demand by the operation of the air conditioner.

In the step S306, the charging-energy management is controlled by using the normal strategy; in other words, when there is not a demand on using the air conditioner, the charger is controlled to charge according to the normal power demand of the battery.

Figure 4:
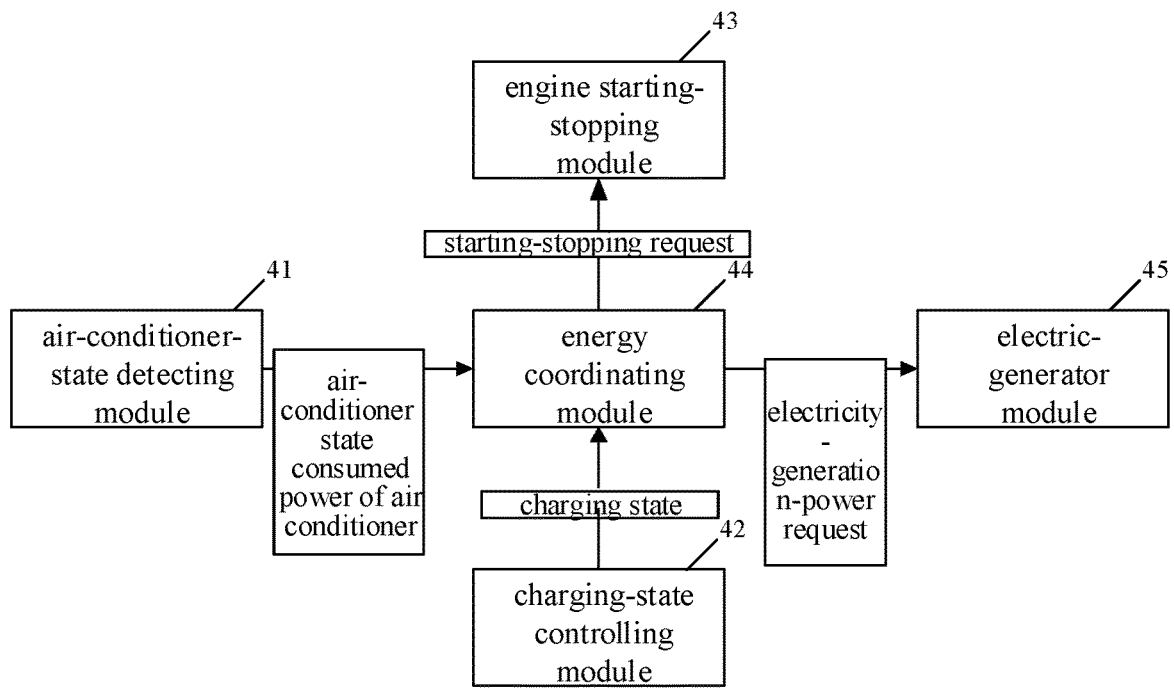
FIG. 4 is a diagram of the controlling principle of the energy coordination control method according to an embodiment of the present disclosure.

In practical applications, referring to FIG. 4, FIG. 4 shows a diagram of the controlling principle of the energy coordination control method according to an embodiment of the present disclosure. As shown in FIG. 4, the control method is completed by an air-conditioner-state detecting module 41, a charging-state controlling module 42, an engine starting-stopping module 43, an energy coordinating module 44 and an electric-generator module 45.

The air-conditioner-state detecting module 41 is configured for determining whether the air conditioner is started up, and reporting the determining result to the energy coordinating module 44, and is configured for, according to the voltages and the currents of the high-pressure heater and the refrigerating compressor, calculating the consumed power of the air conditioner. The charging-state controlling module 42 is configured for controlling the process of the charging of the entire vehicle, and is configured for, after the user has performed the charging action, controlling the vehicle to enter the charging state, and, after the user has performed the charging stopping action or the battery is fully charged, controlling the vehicle to stop charging. The engine starting-stopping module 43 is configured for, after an engine starting-up signal is received, starting up the engine by using a pre-defined process, and shutting down the engine after a shutting-down signal is received. The energy coordinating module 44 is configured for particularly implementing the above-described energy coordination control method. The electric-generator module 45 is configured for, after the engine is started up, converting the mechanical energy generated by the engine into electric energy to be consumed by the air conditioner, wherein the electricity-generation power is equal to the power requested by the energy coordinating module 44.

Figure 5:
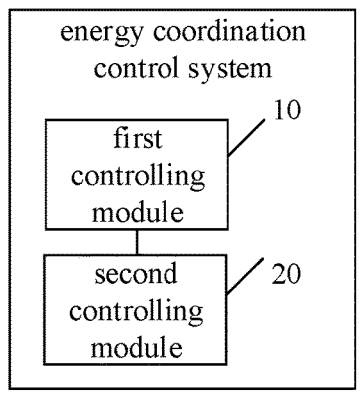
FIG. 5 is a schematic structural diagram of an energy coordination control system according to an embodiment of the present disclosure.

An object of the present disclosure is to provide an energy coordination control system, applied to a vehicle, the vehicle comprising an engine, an electric generator, a battery, a charger and an air conditioner, the electric generator is mechanically connected to the engine, both of the electric generator and the charger are electrically connected to the battery, both of the charger and the battery are electrically connected to the air conditioner. Referring to FIG. 5, FIG. 5 shows a schematic structural diagram of the energy coordination control system according to an embodiment of the present disclosure. The system includes:

a first controlling module 10 configured for, when a charging signal is monitored, controlling the charger to charge the battery, and monitoring an air-conditioner signal of the air conditioner; and a second controlling module 20 configured for, if it is determined according to the air-conditioner signal that the air conditioner demands electricity, controlling the engine to start up, to drive the electric generator to supply electricity to the air conditioner.

In the system according to the embodiment of the present disclosure, when a charging signal is monitored, the first controlling module 10 controls the charger to charge the battery, and monitors an air-conditioner signal of the air conditioner; and, subsequently, when it is determined that the air conditioner demands electricity according to the air-conditioner signal that the, the second controlling module 20 controls the engine to start up, to drive the electric generator to supply electricity to the air conditioner. The reason is that, when the battery is being charged, the air conditioner demands electricity, the engine is started up to drive the electric generator to supply electricity to the air conditioner, the operation of the air conditioner does not need to use the electric energy of the charger or a battery pack, which does not affect the charging power of the battery, and may ensure the normal usage of the air conditioner, thereby solving the problem of conventional hybrid power vehicles that the air conditioner cannot be normally used during charging, to cause a lower speed of regulation on the in-car temperature, to easily bring inconvenience of the driver and the passengers.

Optionally, in the system, the second controlling module 20 includes:

a first controlling unit configured for, if a starting-up signal of the air conditioner is monitored, controlling the air conditioner to start up, and controlling the engine to start up, to drive the electric generator to supply electricity to the air conditioner.

Optionally, in the system, the second controlling module 20 further includes:

a second controlling unit configured for, if monitoring that the air conditioner is in an on-state, controlling the engine to start up, to drive the electric generator to supply electricity to the air conditioner, and controlling the battery to stop to supply electricity to the air conditioner.

Optionally, the system further includes:

a third controlling module configured for, when the charger is charging the battery, if a shutting-down signal of the air conditioner is monitored, controlling the air conditioner to shut down, and controlling the engine to shut down.

Optionally, in the system, the second controlling module 20 is configured for, if determining that the air conditioner demands electricity according to the air-conditioner signal, acquiring a target consumed power of the air conditioner; and controlling the engine to start up, to drive the electric generator to supply electricity to the air conditioner with the target consumed power.

Yet another object of the present disclosure is to provide a vehicle, the vehicle comprising an engine, an electric generator, a battery, a charger and an air conditioner, the electric generator is mechanically connected to the engine, both of the electric generator and the charger are electrically connected to the battery, both of the charger and the battery are electrically connected to the air conditioner, wherein the electric generator is electrically connected to the air conditioner, and the vehicle further includes the energy coordination control system.

The energy coordination control system and the vehicle have the same advantages as those of the above energy coordination control method over the prior art, which is not discussed herein further.

In conclusion, the method and energy coordination control system and the vehicle according to the present application include, when a charging signal is monitored, controlling the charger to charge the battery, and monitoring an air-conditioner signal of the air conditioner; subsequently, determining whether the air conditioner demands electricity according to the air-conditioner signal; and if determining that the air conditioner demands electricity according to the air-conditioner signal, controlling the engine to start up, to drive the electric generator to supply electricity to the air conditioner. Because, if when the battery is being charged the air conditioner demands electricity, the engine is started up to drive the electric generator to supply electricity to the air conditioner, the operation of the air conditioner does not need to use the electric energy of the charger or a battery pack, which does not affect the charging power of the battery, and may ensure the normal usage of the air conditioner, thereby solving the problem of conventional hybrid power vehicles that the air conditioner cannot be normally used during charging, to cause a lower speed of regulation on the in-car temperature, to easily bring inconvenience of the driver and the passengers.

A person skilled in the art may clearly understand that, in order for the convenience and concision of the description, the particular working processes of the above-described systems, devices and units may refer to the corresponding processes according to the above-described process embodiments, and are not discussed herein further.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The above are merely particular embodiments of the present disclosure, and the protection scope of the present disclosure is not limited thereto. All of the variations or substitutions that a person skilled in the art may easily envisage within the technical scope disclosed by the present disclosure should fall within the protection scope of the present disclosure. Therefore, the protection scope of the present disclosure should be subject to the protection scope of the claims.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to the actual demands to implement the purposes of the solutions of the embodiments. A person skilled in the art may understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 6:
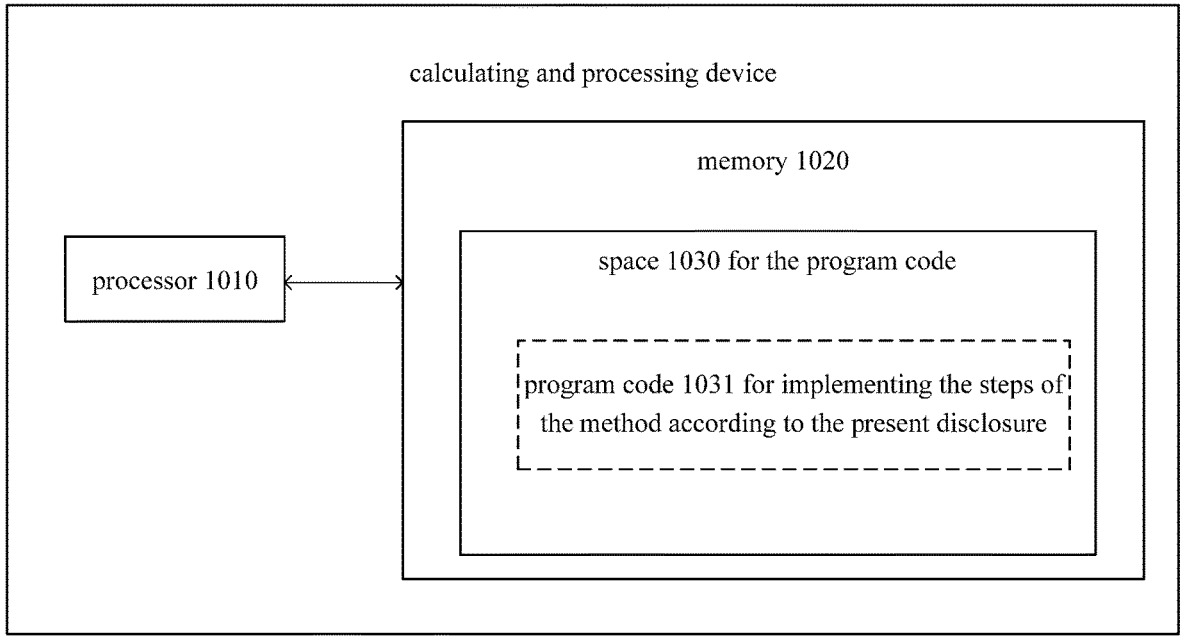
FIG. 6 schematically shows a block diagram of a calculating and processing device for implementing the method according to the present disclosure.
Figure 7:
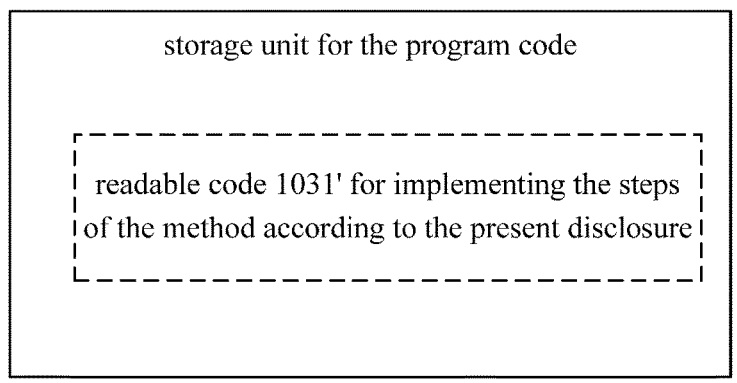
FIG. 7 schematically shows a storage unit for maintaining or carrying a program code for implementing the method according to the present disclosure.

For example, FIG. 6 shows a calculating and processing device that may implement the method according to the present disclosure. The calculating and processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 7. The storage unit may have storage segments or storage spaces with similar arrangement to the memory 1020 of the calculating and processing device in FIG. 6. The program codes may, for example, be compressed in a suitable form. Generally, the storage unit contains a computer-readable code 1031', which may be read by a processor like 1010. When those codes are executed by the calculating and processing device, the codes cause the calculating and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An energy coordination control method, applied to a vehicle, the vehicle comprising an engine, an electric generator, a battery, a charger and an air conditioner, the electric generator is mechanically connected to the engine, both of the electric generator and the charger are electrically connected to the battery, the battery is electrically connected to the air conditioner, wherein the electric generator is electrically connected to the air conditioner, and the method comprises:
by one or more processors, when a charging signal is monitored, controlling the charger to charge the battery, and monitoring an air-conditioner signal of the air conditioner; and
by the one or more processors, when it is determined that the air conditioner demands electricity according to the air-conditioner signal, controlling the engine to start up, to drive the electric generator to supply electricity to the air conditioner;
when it is determined that the air conditioner demands electricity according to the air-conditioner signal, controlling the engine to start up, to drive the electric generator to supply electricity to the air conditioner comprises:
when a starting-up signal of the air conditioner is monitored, controlling the air conditioner to start up, and controlling the engine to start up, to drive the electric generator to supply electricity to the air conditioner;
when it is determined that the air conditioner demands electricity according to the air-conditioner signal, controlling the engine to start up, to drive the electric generator to supply electricity to the air conditioner comprises:
when the air conditioner is monitored to be in an on-state, controlling the engine to start up, to drive the electric generator to supply electricity to the air conditioner, and controlling the battery to stop to supply electricity to the air conditioner;
the method further comprises:
when a shutting-down signal of the air conditioner is monitored when the charger is charging the battery, controlling the air conditioner to shut down, and controlling the engine to shut down.

2. The method according to claim 1, wherein controlling the engine to start up, to drive the electric generator to supply electricity to the air conditioner comprises:
acquiring a target consumed power of the air conditioner; and
controlling the engine to start up, to drive the electric generator to supply electricity to the air conditioner with the target consumed power.

3. An energy coordination control system, applied to a vehicle, the vehicle comprising an engine, an electric generator, a battery, a charger and an air conditioner, the electric generator is mechanically connected to the engine, both of the electric generator and the charger are electrically connected to the battery, the battery is electrically connected to the air conditioner, wherein the electric generator is electrically connected to the air conditioner, and the system comprises:
one or more processors and a storage apparatus; and
the storage apparatus stores a computer program which, when executed by the one or more processors, perform the operations comprising:
when a charging signal is monitored, controlling the charger to charge the battery, and monitoring an air-conditioner signal of the air conditioner; and
when it is determined that the air conditioner demands electricity according to the air-conditioner signal, controlling the engine to start up, to drive the electric generator to supply electricity to the air conditioner;
the operation of when it is determined that the air conditioner demands electricity according to the air-conditioner signal, controlling the engine to start up, to drive the electric generator to supply electricity to the air conditioner comprises:

when a starting-up signal of the air conditioner is monitored, controlling the air conditioner to start up, and controlling the engine to start up, to drive the electric generator to supply electricity to the air conditioner;

the operations of the system comprise:

when the air conditioner is monitored to be in an on-state, controlling the engine to start up, to drive the electric generator to supply electricity to the air conditioner, and controlling the battery to stop to supply electricity to the air conditioner;

the operations of the system further comprise:

when the charger is charging the battery, when a shutting-down signal of the air conditioner is monitored, controlling the air conditioner to shut down, and controlling the engine to shut down.

4. The system according to claim 3, wherein the operations of the system comprise: when it is determined that the air conditioner demands electricity according to the air-conditioner signal, acquiring a target consumed power of the air conditioner; and controlling the engine to start up, to drive the electric generator to supply electricity to the air conditioner with the target consumed power.

5. A vehicle, the vehicle comprising an engine, an electric generator, a battery, a charger and an air conditioner, the electric generator is mechanically connected to the engine, both of the electric generator and the charger are electrically connected to the battery, both of the charger and the battery are electrically connected to the air conditioner, wherein the electric generator is electrically connected to the air conditioner, and the vehicle further comprises the energy coordination control system according to claim 3.

6. A calculating and processing device, wherein the calculating and processing device comprises:

a memory storing a computer-readable code; and one or more processors, wherein when the computer-readable code is executed by the one or more processors, the calculating and processing device implements an energy coordination control method, applied to a vehicle, the vehicle comprising an engine, an electric generator, a battery, a charger and an air conditioner, the electric generator is mechanically connected to the engine, both of the electric generator and the charger are electrically connected to the battery, the battery is electrically connected to the air conditioner, wherein the electric generator is electrically connected to the air conditioner, and the method comprises:

when a charging signal is monitored, controlling the charger to charge the battery, and monitoring an air-conditioner signal of the air conditioner; and when it is determined that the air conditioner demands electricity according to the air-conditioner signal, controlling the engine to start up, to drive the electric generator to supply electricity to the air conditioner;

when it is determined that the air conditioner demands electricity according to the air-conditioner signal, controlling the engine to start up, to drive the electric generator to supply electricity to the air conditioner comprises:

when a starting-up signal of the air conditioner is monitored, controlling the air conditioner to start up, and controlling the engine to start up, to drive the electric generator to supply electricity to the air conditioner;

when it is determined that the air conditioner demands electricity according to the air-conditioner signal, controlling the engine to start up, to drive the electric generator to supply electricity to the air conditioner comprises:

when the air conditioner is monitored to be in an on-state, controlling the engine to start up, to drive the electric generator to supply electricity to the air conditioner, and controlling the battery to stop to supply electricity to the air conditioner;

the method further comprises:

when a shutting-down signal of the air conditioner is monitored when the charger is charging the battery, controlling the air conditioner to shut down, and controlling the engine to shut down.

7. The device according to claim 6, wherein controlling the engine to start up, to drive the electric generator to supply electricity to the air conditioner comprises:

acquiring a target consumed power of the air conditioner; and controlling the engine to start up, to drive the electric generator to supply electricity to the air conditioner with the target consumed power.

8. A non-transitory computer-readable medium, wherein the non-transitory computer-readable medium stores a computer-readable code, and when the computer-readable code is executed, the energy coordination control method according to claim 1 is performed.

* * * * *